US012284160B2

(12) United States Patent
Silavong et al.

(10) Patent No.: US 12,284,160 B2
(45) Date of Patent: Apr. 22, 2025

(54) SYSTEMS AND METHODS FOR FEDERATED SECURE VOCABULARY LEARNING

(71) Applicant: JPMORGAN CHASE BANK, N.A., New York, NY (US)

(72) Inventors: Fanny Silavong, London (GB); Antonios Georgiadis, London (GB); Sean Moran, London (GB); Brett Sanford, Tunbridge Wells (GB); Rob Otter, Witham (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 523 days.

(21) Appl. No.: 17/651,337

(22) Filed: Feb. 16, 2022

(65) Prior Publication Data

US 2023/0064540 A1    Mar. 2, 2023

(30) Foreign Application Priority Data

Aug. 27, 2021 (GR) .............................. 20210100573

(51) Int. Cl.
H04L 9/40      (2022.01)
(52) U.S. Cl.
CPC ................... *H04L 63/0428* (2013.01)

(58) Field of Classification Search
None
See application file for complete search history.

(56) References Cited

U.S. PATENT DOCUMENTS

| | | | |
|---|---|---|---|
| 2021/0174257 A1* | 6/2021 | Pothula | G06F 16/27 |
| 2021/0314140 A1* | 10/2021 | Stephenson | H04L 9/3218 |
| 2022/0391778 A1* | 12/2022 | Green | G06N 20/20 |

* cited by examiner

*Primary Examiner* — Normin Abedin
(74) *Attorney, Agent, or Firm* — GREENBERG TRAURIG LLP (57) ABSTRACT

Systems and methods for federated secure vocabulary learning. The method may include communicating, by a first client network and a second client network and to a global federation terminal, a first set of encrypted tokens and a second set of encrypted tokens. The method may further include generating, by the global federation terminal, a consolidated vocabulary based on the first set of encrypted tokens and the second set of encrypted tokens. The method may include determining, a first set of weights and a second set of weights for the consolidated vocabulary. The method may include receiving by the global federation terminal the first set of weights and the second set of weights. The method may further include aggregating the first set of weights and the second set of weights. The method may further include distributing, to the first client network and the second client network, an aggregated set of weights.

18 Claims, 5 Drawing Sheets

SYSTEMS AND METHODS FOR FEDERATED SECURE VOCABULARY LEARNING

RELATED APPLICATIONS

This application claims priority to Greek patent application No. 20210100573, filed Aug. 27, 2021, the disclosure of which is hereby incorporated, by reference, in its entirety.

BACKGROUND OF THE INVENTION

1. Technical Field

Embodiments are generally related to systems and methods for federated secure vocabulary learning.

2. Description of the Related Art

Developing language-based models in a Federated Learning environment presents challenges with developing a dynamic vocabulary. Conventional models require client models to share each new word/token to the centralized learning model in plain text. This presents security vulnerabilities that are undesirable in a Federated Learning model.

Alternative models have a centralized vocabulary and training. The challenge presented by these models is that there is a fixed vocabulary and if any of the distributed client models encounter an unknown or new word, the word is ignored. There is no language with a fixed number of words over a time period and thus these models are also insufficient to address the expanding vocabularies.

SUMMARY OF THE INVENTION

Systems and methods for federated machine secure vocabulary learning are disclosed. According to one embodiment, a system for securely learning vocabulary using federated machine learning model includes a first client network that may include a first client machine learning model The first client network may communicate a set of encrypted tokens to a global federation terminal in an initialization prior to learning a set of weights by the first machine learning model. The first client network may be configured to receive a consolidated vocabulary and an initial set of weights. The first client network may be further configured to extract, from a first phrase, a first set of one or more tokens. The first client network may be further configured to determine a first set of weights for the first phrase. The first client network may be further configured to communicate the first set of weights to the global federation terminal. The system may further include a second client network including a second client machine learning model. The second machine learning model may be configured to perform operations similar to those described with regard to the first machine learning model. The second client network may communicate a set of encrypted tokens to the global federation terminal. The second client network may be configured to receive a consolidated vocabulary from the global federation terminal. The client network may be further configured to communicate the second set of weights to the global federation terminal In some embodiments, the first machine learning model of the system may be configured to determine, for each token of the set of one or more tokens, a classification of a phrase, a word, or a variable, and output, for each token of the set of one or more tokens, the classification of the word or variable. In other embodiments, the first machine learning model may be configured to determine a classification for a group of tokens up to and including the entire set of one or more tokens.

In some embodiments, the first machine learning model is further configured to determine that a selected token is a variable with an associated value, redact the associated value, and generate a generic token that represents the associated value.

In some embodiments, the global federation terminal may be further configured to assign an initial machine learning model to the first client network and the second client network. The global federation terminal may be further configured to synchronize the machine learning models of the client networks after the initial assignment.

In some embodiments, the global federation terminal is further configured to store the first set of weights and the second set of weights in a parameter storage partition and store the first set of encrypted tokens and the second set of encrypted tokens in an encrypted token storage partition.

In some embodiments, the global federation terminal is further configured to update the first set of weights or the second set of weights based on a comparison between the first set of weights and the second set of weights.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for secure vocabulary learning by federated machine learning. For example, embodiments may leverage the use of multiple machine learning models, a global federation terminal, and various client networks. Embodiments may address issues relating to privacy and security of vocabulary learning in a federated machine learning environment.

Figure 1:
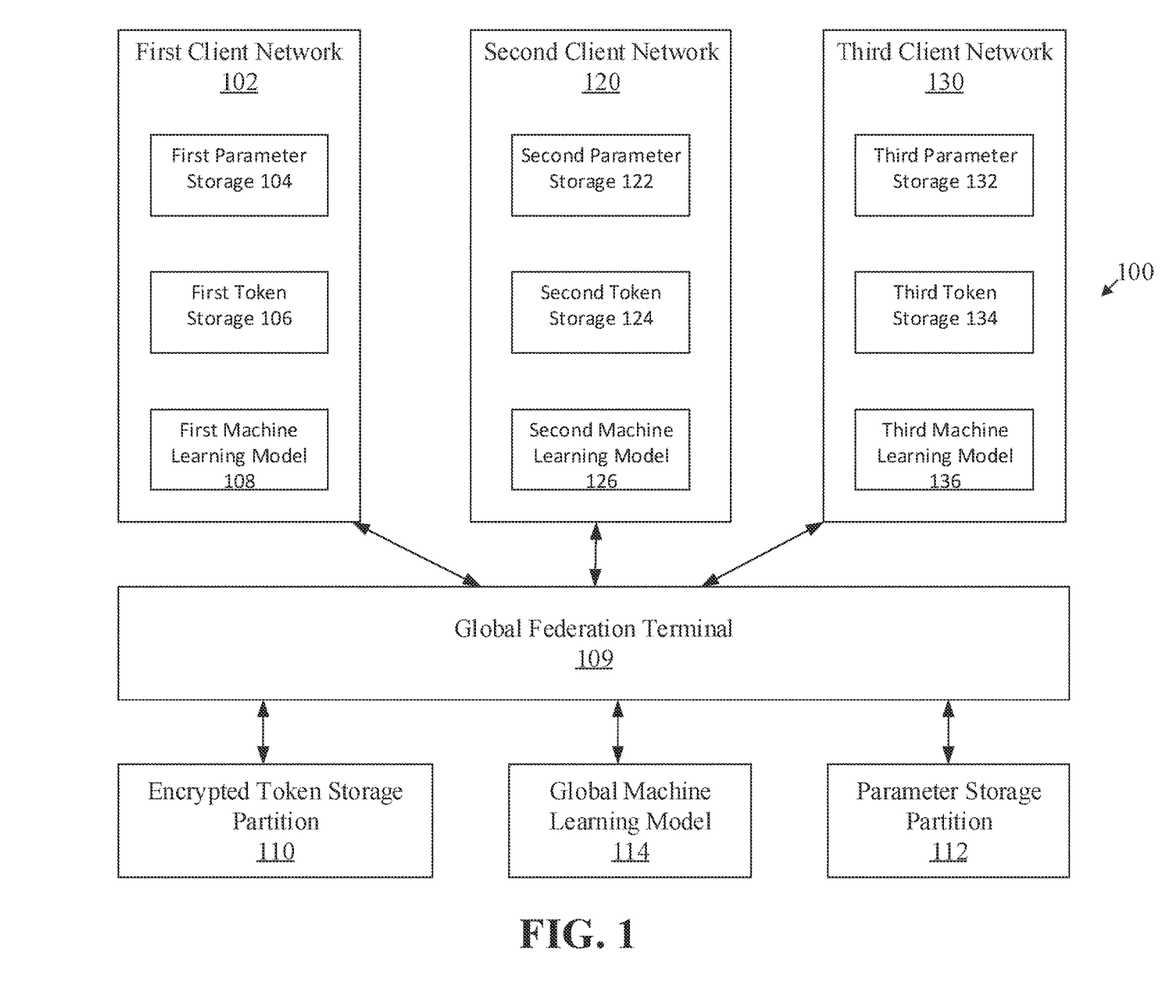
FIG. 1 depicts an example of a system for secure vocabulary learning by federated machine learning, according to certain embodiments of the present disclosure.

Referring now to the figures, FIG. 1 depicts a system for secure vocabulary learning using federated machine learning that is disclosed according to certain embodiments of the present disclosure. System 100 may include first client network 102, second client network 120, third client network 130, a global federation terminal 109, an encrypted token storage 110, parameter storage partition 112, and a global machine learning model 114 . . . . As one of skill in the art will appreciate, while FIG. 1 depicts three client networks, any number of client networks can be implemented without departing from the teachings of the present disclosure.

First client network 102 may be a computing network that includes a plurality of computing devices, a first machine learning model 108, first token storage 106, and first parameter storage 104. In one example, the first machine learning model 108 may be associated with a first knowledge domain with an associated domain-specific vocabulary. The first knowledge domain may be determined based on a functionality of the first client network 102 such as a software development environment. In the present example, the domain-specific vocabulary may be a combination of a first collection of terms associated with software development such as a various functions or syntax of a particular programming language and a second collection of terms relating to text artifacts in the code base. An example of a text artifact in the code base may be "password" indicating that a developer hard-coded an authentication credential into the code base such as for testing or development. The first machine learning model 108 may be trained to identify text artifacts that present vulnerabilities within the code base for removal.

The first machine learning model 108 may generate a plurality of sets of weights and a plurality of sets of tokens that represent words or phrases in the knowledge domain. In one example, the first machine learning model may generate a set of weights that indicate a relative importance of terms within the knowledge domain. In the present example, the machine learning model may determine that commands or declarations (e.g., CHAR, STRING, etc.) or function calls as more important (e.g., assign a higher weight) than term in a comment or subroutine. Additionally, the first machine learning model may determine that certain words such as "password," "key," or "authentication" or the like as more important because such words may indicate a particular vulnerability within the code base.

Second client network 120 may be a computing network that includes a plurality of computing devices, second parameter storage 122, second token storage 124, and second machine learning model 126. In one example, the second machine learning model 126 may be associated with a second knowledge domain with an associated domain-specific vocabulary. The second knowledge domain may be determined based on a functionality of the second client network 120 such as a financial services vocabulary. In the present example, the domain-specific vocabulary may be a vocabulary including terms such as "fraud," "transaction," or "authorization," and the like. The domain specific vocabulary may also include text artifacts relating the financial services such as "PIN," "Account," or "Security Code" indicating that a privacy sensitive term or a value that may be redacted as described with regard to FIG. 4. The second machine learning model 126 may be trained to identify text artifacts that present vulnerabilities within the financial services vocabulary.

The second machine learning model 126 may generate a plurality of sets of weights and a plurality of sets of tokens that represent words or phrases in the knowledge domain. In one example, the machine learning model may generate a second set of weights that indicate a relative importance of terms within the knowledge domain. In the present example, the machine learning model may determine that identifiers of authentication or account details (e.g., PIN, ACCT NO, etc.) as more important (e.g., assign a higher weight) than term in a bank identifier (e.g., ABA Number). Additionally, the machine learning model may determine that certain words such as "customer," "security," or "balance" or the like as more important because such words may indicate a particular vulnerability with regard to privacy of sensitive information relating to customers and accounts.

Third client network 130 may be a computing network that includes a plurality of computing devices, third parameter storage 132, third token storage 134, and third machine learning model 136. In one example, the third machine learning model 136 may be associated with a third knowledge domain with an associated domain-specific vocabulary. The third knowledge domain may be determined based on a functionality of the third client network 130 such as a software development environment of a financial institution. In the present example, the domain-specific vocabulary may be a combination of software development terms such as a various functions or syntax of a particular programming language and terms relating to the financial institution. An example of terms relating to the financial institution may be "card issuer," or "card number" indicating that a developer hard-coded a financial instrument or payment details into the code base such as for testing or development. The third machine learning model 136 may be trained to identify terms relating to the financial institution that present vulnerabilities within the code base for removal or redaction.

The third machine learning model 136 may generate a plurality of sets of weights and a plurality of sets of tokens that represent words or phrases in the knowledge domain. In one example, the third machine learning model 136 may generate a set of weights that indicate a relative importance of terms within the knowledge domain. In the present example, the machine learning model may determine that account identifying information (e.g., ACCT NO, CARD NO, etc.) or transaction authorization credentials as more important (e.g., assign a higher weight) than term relating to a generic banking function. Additionally, the third machine learning model 136 may determine that certain words such as "issuer," "counterparty," or "payee" or the like as more important because such words may indicate a particular vulnerability relating to security of transactions.

Global federation terminal 109 may be a server that communicates with multiple client networks. The global federation terminal 109 may communicate a machine learning model for use by each of first client network 102, second client network 120, and third client network 130 to perform local machine learning. The global federation terminal 109 may further be configured to receive a set of encrypted tokens and a set of weights from each of the client networks. Global federation terminal 109 may store the sets of encrypted tokens in encrypted token storage 110 and the sets of weights in parameter storage partition 112. Global federation terminal 109 may further be configured to assign an initial machine learning model to the client networks. Global federation terminal 109 may be further configured to update the machine learning assigned to the client networks.

Encrypted token storage 110 may be a database, structured data format, or the like for storing a plurality of encrypted tokens. The encrypted token storage 110 may populate the database with a plurality of encrypted tokens that have an associated weight in parameter storage partition 112. The encrypted token storage 110 may further encrypt the encrypted tokens with an additional encryption key or hashing algorithm. The encrypted token storage 110 may de-duplicate encrypted tokens.

Parameter storage partition 112 may be a data structure to store parameters of one or more machine learning models. In some examples, parameter storage partition 112 may store a set of parameters with metadata identifying the machine learning model, client network, or knowledge domain to which the parameters correspond. For instance, a first set of weights (i.e., parameters) may apply to the first machine learning model and a first knowledge domain. Parameter storage partition 112 may partition the data structure to store parameters associated with different machine learning models in separate partitions.

Figure 2:
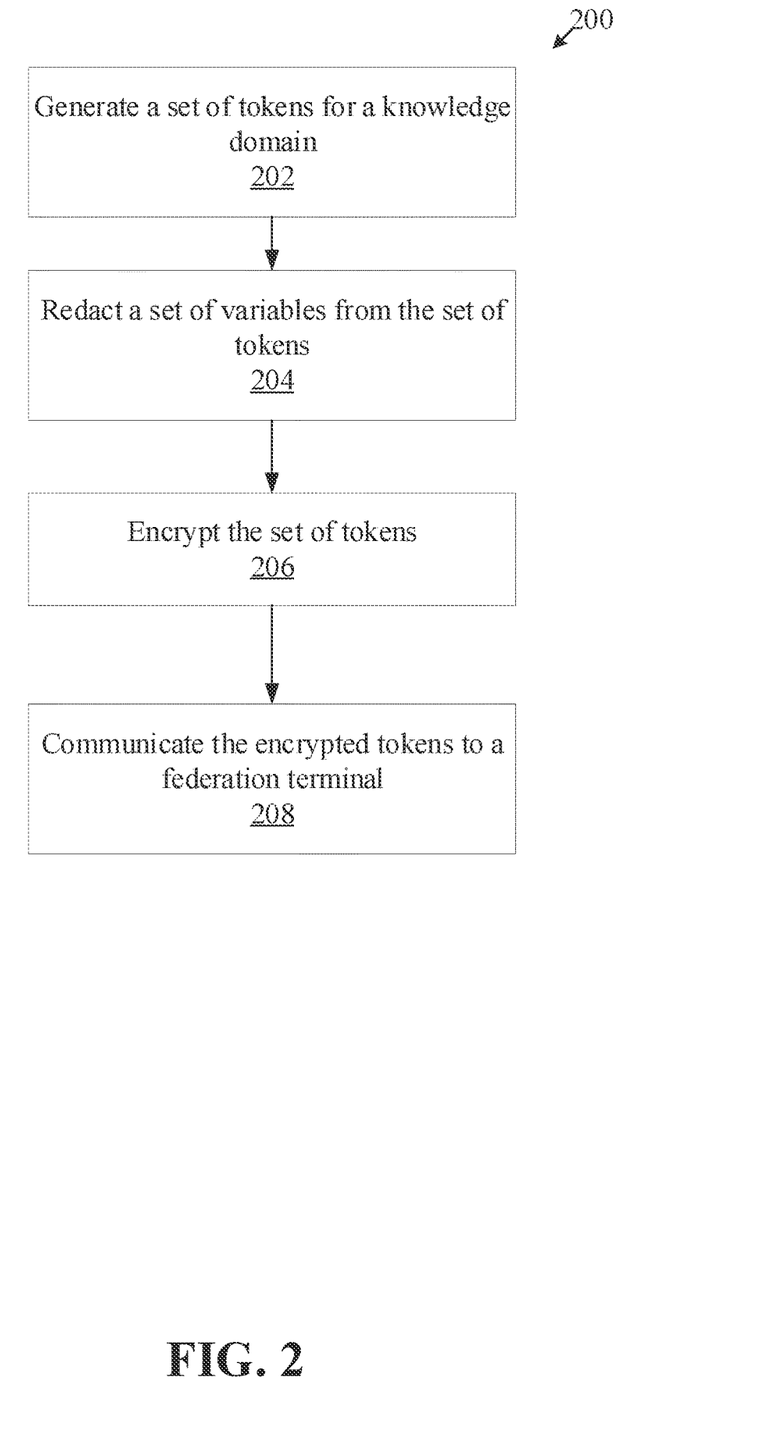
FIG. 2 depicts an example of a process for secure vocabulary learning by federated machine learning, according to certain embodiments of the present disclosure.

FIG. 2 depicts an example of a process 200 for a federated machine learning model generating a secure vocabulary, according to certain embodiments of the present disclosure. The steps of process 200 may be performed by one or more software applications executed by one or more computing devices of the respective client network or global federation terminal.

At block 202, the process 200 involves generating a set of tokens for a knowledge domain. For example, the knowledge domain may be associated with a particular vocabulary of words or symbols such as a software development environment. In some aspects, the vocabulary may include plain language words such as "equal" and domain specific words such as "password" or "Java®" or "Ruby on Rails®" and additionally may include non-word symbols such as "=" or "+" that have an understood meaning in the domain-specific vocabulary. Each machine learning model may generate a set of tokens based on the knowledge domain.

In a non-limiting example, a knowledge domain may be a software development environment including a particular software development language. The set of tokens may be a hash or a representation of the specific word or symbol. In some embodiments, the set of tokens may represent more than one specific word or symbol such as a group of words or symbols that commonly occur together. In certain embodiments, the machine learning model may generate the set of tokens based on a predetermined format or the machine learning model may determine the format of the set of tokens.

At block 204, the process 200 involves redacting a set of variables from the set of tokens. For example, the set of variables may include numerical, qualitative, or other particular values. The machine learning model may determine that these values are unique to the particular combination of tokens (e.g., "the price is $50", where 50 is the value of the variable). The machine learning model may redact the value and represent the value with a generic token. Additional description is provided with regard to FIG. 3.

At block 206, the process 200 involves encrypting the set of tokens. In one example, the respective client network may encrypt the set of tokens generated by the machine learning model associated with the respective client network. The client network may encrypt the set of tokens using any encryption method. In some embodiments, a global federation terminal may communicate a predetermined encryption method to be used by the client networks. The global federation terminal may further determine that a different encryption method is to be used and the client network may update the encryption of the set of tokens (e.g., decrypt the set of tokens and encrypt with the updated encryption method, etc.).

At block 208, the process 200 involves communicating the set of encrypted tokens and the set of weights to a federation terminal. The client network may include one or more processors or communication modules for transmitting electronic data from the client network to the global federation terminal. In some examples, the client network may communicate the set of encrypted tokens and the set of weights using TCP/IP, HTTP, a virtual private network, SSH, or other suitable means for communication between the client network and the global federation terminal.

Figure 3:
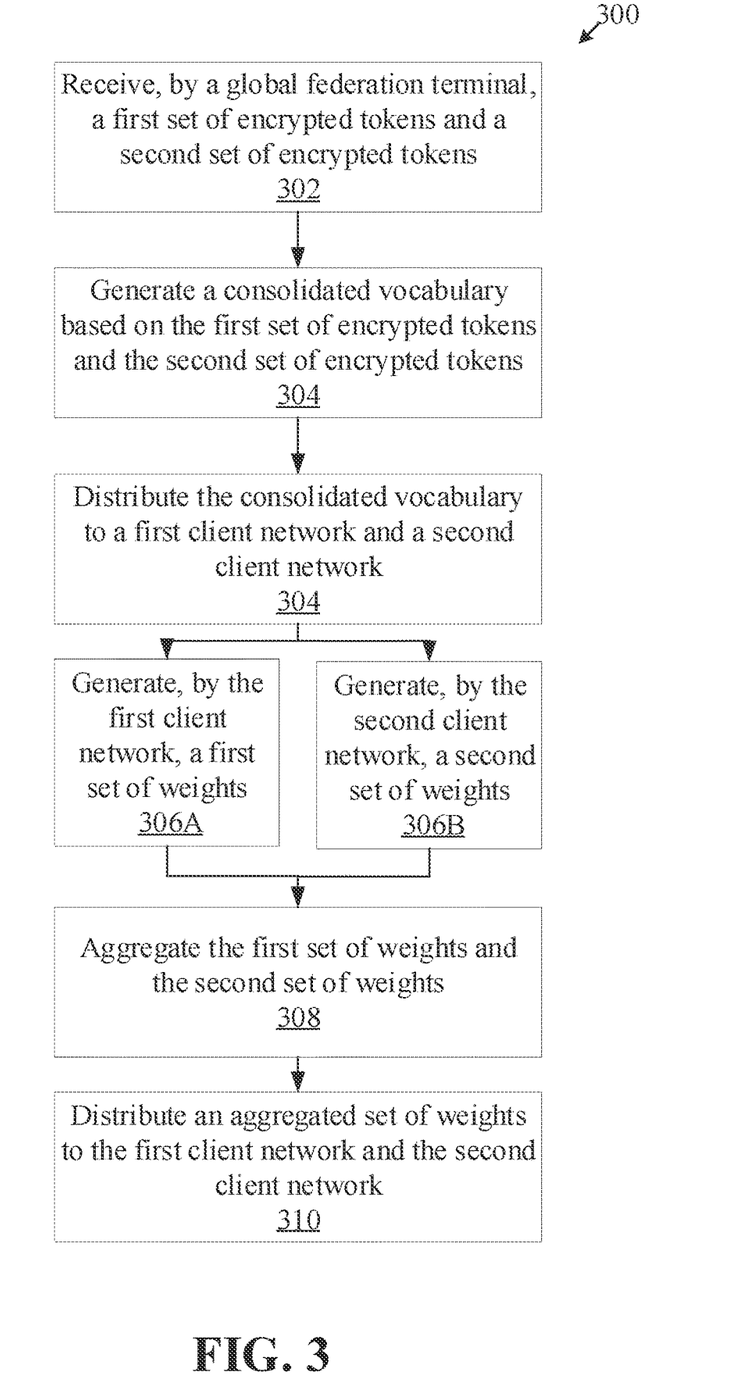
FIG. 3 depicts an example of a process of federating secure vocabulary learning, according to certain embodiments of the present disclosure.

FIG. 3 depicts an example of a secure vocabulary learning by a federated machine learning, according to certain embodiments of the present disclosure.

At step 302, the process 300 involves receiving a first set of encrypted tokens and a second set of encrypted tokens by a global federation terminal. For example, a machine learning model of a first client network may generate a set of encrypted tokens that are associated with a first knowledge domain. A global federation terminal may receive the set of encrypted tokens from the first client network. The global federation terminal may store the set of tokens in a non-transitory storage medium.

At step 304, the process 300 involves generating a consolidated vocabulary based on the first set of encrypted tokens and the second set of encrypted tokens. For example, the global federation terminal may combine the first set of encrypted tokens and the second set of encrypted tokens. The global federation terminal may be configured to store the consolidated vocabulary in a non-transitory medium, such as an encrypted token storage partition. In some examples, the global federation terminal may store the first set of encrypted tokens and the second set of encrypted tokens separately and generate the consolidated vocabulary at predetermined time intervals for communication to the client networks.

At steps 306A and 306B, the process 300 involves generating a plurality of sets of weights that represent words or phrases in a knowledge domain associated with the client network. In one example, at step 306A, the first machine learning model may generate a first set of weights that indicate a relative importance of terms within the knowledge domain associated with the first client network. At step 306B. the second machine learning model may generate a second set of weights that indicate a relative importance of terms within the knowledge domain associated with the second client network. As one of skill in the art will understand, any number of client networks may generate a respective set of weights using the consolidated vocabulary as desired for any configuration of client networks.

At step 308, the process 300 involves aggregating the first set of weights and the second set of weights. The global federation terminal may include one or more processors or communication modules for receiving electronic data from the client networks. In one example, the global federation terminal may receive a plurality of sets of weights and a plurality of sets of encrypted tokens from respective different client networks. Each client network may have an associated machine learning model that generates sets of weights and sets of tokens for the client network. In some examples, the global federation terminal may receive the first set of weights and the second set of weights using TCP/IP, HTTP, a virtual private network, SSH, or other suitable means for communication between the global federation terminal and the first client network. The global federation terminal may aggregate the first set of weights and the second set of weights into a consolidated set of weights. The global federation terminal may perform the aggregation by computing an average of the weights, an average of gradients, and average of a weight change, or the like.

At step 310, the process 300 involves distributing an aggregated set of weights to the first client network and the second client network. The global federation terminal may include one or more processors or communication modules for transmitting electronic data to the various client networks. In some examples, the global federation terminal may communicate the aggregated set of weights using TCP/IP, HTTP, a virtual private network, SSH, or other suitable means for communication.

Figure 4:
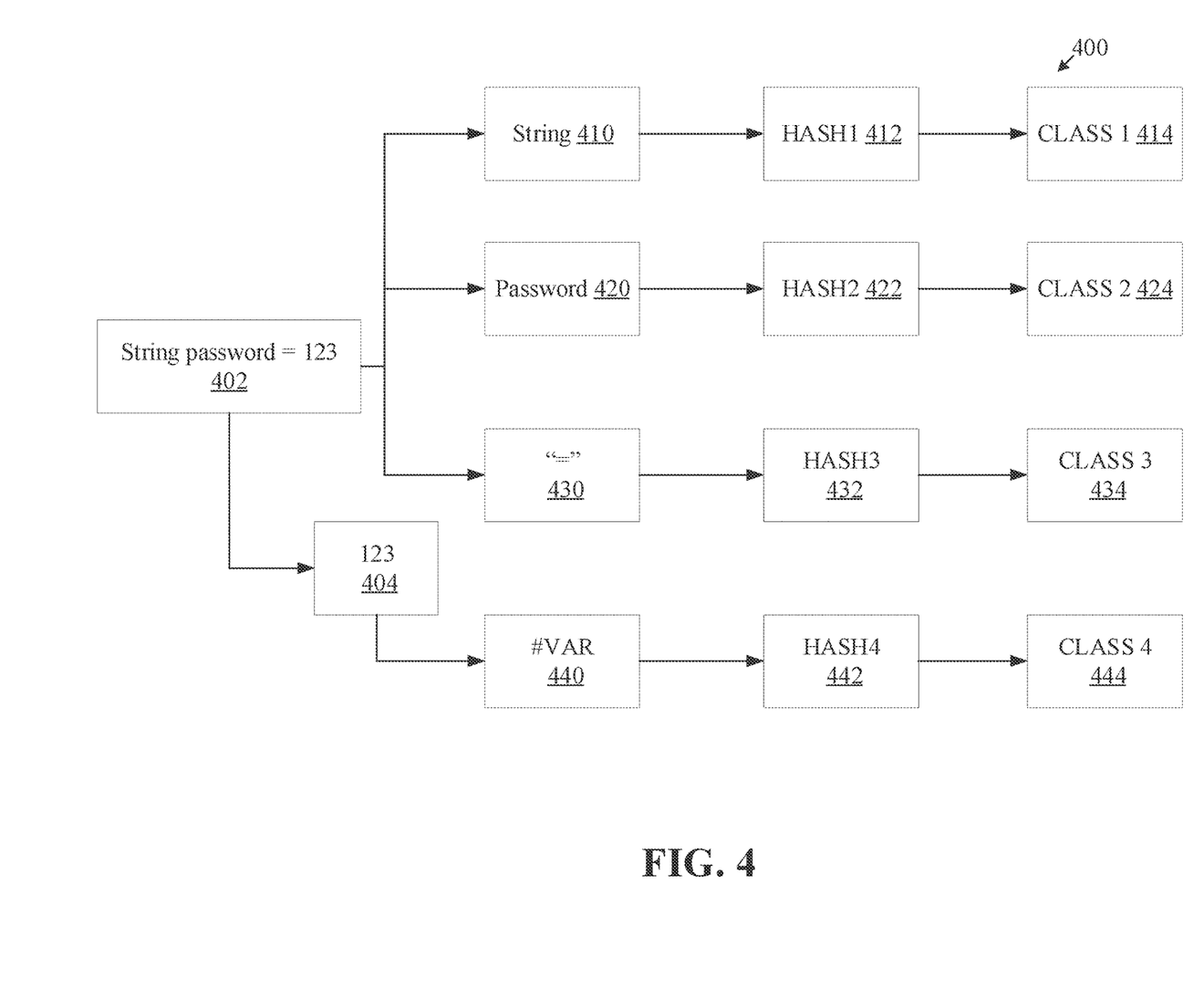
FIG. 4 depicts an example of a process of secure vocabulary learning including variable redaction by federated machine learning, according to certain embodiments of the present disclosure.

FIG. 4 depicts an example of process 400 of secure vocabulary learning including variable redaction by federated machine learning, according to certain embodiments of the present disclosure. In one example, a machine learning model of a client network (e.g., first client network, second client network, or third client network, etc.) may receive a phrase 402 such as a collection of symbols including text or symbols that have a meaning in the domain-specific vocabulary. In some embodiments, the machine learning model may extract features and output a classification of the phrase 402 as a single classification. In other embodiments, the machine learning model may extract features and output a classification of each symbol or word of the phrase 402. As described below, the use of "string" here indicates a literal term in a software language that may be a declaration of a data type rather than referring to the generic data type.

In this example, the machine learning model may extract symbols from the phrase 402. The machine learning model may extract string 410, password 420, "=" 430, and "123" 404. The machine learning model may determine that "123" is a particular value based on the position relative to the symbol indicative of a value (e.g., an equals sign, a comparison sign, or a not equals sign, etc.) The machine learning model may redact the value 404 and represent the value as a redaction indicator such as #VAR 440.

The machine learning model may perform a one-way hash function of string 410, password 420, "=" 430, and #VAR 440. The machine learning model may generate respective HASH1 412, HASH2 422, HASH3 432, and HASH4 442 that represent the respective terms of phrase 402. In some embodiments, the machine learning model may classify a collection of the hashes into a single class that represents a meaning of the phrase 402. In other embodiments, the machine learning model may classify each respective hash or a group of hashes into class 1 414, class 2 424, class 3 434, and class 4 444 that respectively represent a meaning of the respective symbol of the phrase 402. In still other embodiments, the machine learning model may dynamically determine the grouping of the hashes for classification.

Figure 5:
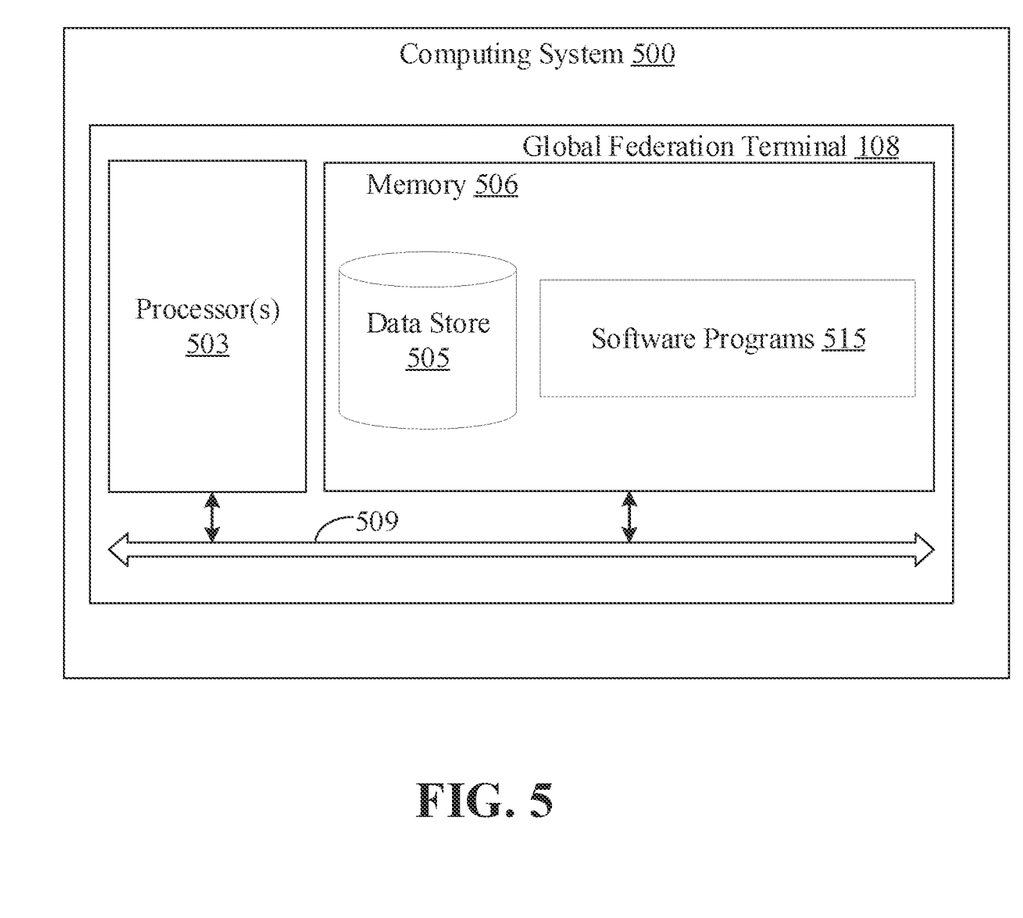
FIG. 5 depicts an example of computing device for implementing the system for secure vocabulary learning, according to certain embodiments of the present disclosure.

FIG. 5 depicts an example of computing device 500 according to certain embodiments of the present disclosure. The implementation of computing device 500 could be used for one or more of the system for secure vocabulary learning by federated machine learning. The depicted example of the computing device 500 includes a processor 503 coupled to a memory 506. The processor 503 executes computer-executable program code stored in memory 506, such as software programs 515 and stores program-related information in data store 505. The processor 503 and the memory 506 may be coupled by a bus 509. In some examples, the bus 509 may also be coupled to one or more network interface devices (not shown).

Although several embodiments have been disclosed, it should be recognized that these embodiments are not exclusive to each other, and certain elements or features from one embodiment may be used with another.

Hereinafter, general embodiments of implementation of the systems and methods of the invention will be described.

The system of the invention or portions of the system of the invention may be in the form of a "processing machine," such as a general-purpose or specialized computing device, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or a software application.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that are capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for federated secure vocabulary learning, the system comprising:
   a first client network comprising a first machine learning model, wherein the first machine learning model is configured to:
   generate a first set of tokens for a first knowledge domain;

encrypt the first set of tokens to form a first set of encrypted tokens;

communicate the first set of encrypted tokens to a global federation terminal;

receive a consolidated vocabulary from the global federation terminal; and determine a first set of weights for the consolidated vocabulary, wherein each individual weight represents a respective token of the consolidated vocabulary;

a second client network comprising a second machine learning model wherein the second machine learning model is configured to:

generate a second set of tokens for a second knowledge domain;

encrypt the second set of tokens to form a second set of encrypted tokens;

communicate to a global federation terminal, the second set of encrypted tokens;

receive a consolidated vocabulary from the global federation terminal; and determine a second set of weights for the consolidated vocabulary, wherein each individual weight represents a respective token of the consolidated vocabulary; and the global federation terminal comprising:

a memory and a processor, wherein the processor is configured to perform instructions stored in memory that cause the processor to perform operations comprising:

receive, from the first client network, the first set of encrypted tokens;

receive, from the second client network, the second set of encrypted tokens;

generate a consolidated vocabulary based on the first set of encrypted tokens and the second set of encrypted tokens; and communicate the consolidated vocabulary to the first client network and the second client network.

2. The system of claim 1, wherein the first machine learning model is further configured to:

determine, for the first set of tokens, a classification of the first set of tokens, and output, for the first set of tokens, the classification of the first set of tokens.

3. The system of claim 2, wherein the first machine learning model is further configured to:

determine that a selected token is a variable with an associated value;

redact the associated value; and generate a generic token that represents the associated value.

4. The system of claim 1, wherein the global federation terminal is further configured to assign an initial machine learning model to the first client network and the second client network.

5. The system of claim 1, wherein the global federation terminal is further configured to:

receive a first set of weights from the first client network and a second set of weights from the second client network, wherein the first set of weights and the second set of weights are based on the consolidated vocabulary.

6. The system of claim 1, wherein the global federation terminal is further configured to update the first set of weights or the second set of weights based on a comparison between the first set of weights and the second set of weights.

7. A method of federated secure vocabulary learning, the method comprising:

communicating, by a first client network and to a global federation terminal, a first set of encrypted tokens;

communicating, by a second client network and to the global federation terminal, a second set of encrypted tokens;

generating, by the global federation terminal, a consolidated vocabulary based on the first set of encrypted tokens and the second set of encrypted tokens;

determining, by the first client network, a first set of weights for the consolidated vocabulary; and determining, by the second client network, a second set of weights for the consolidated vocabulary;

receiving by the global federation terminal the first set of weights and the second set of weights;

aggregating the first set of weights and the second set of weights; and distributing, to the first client network and the second client network, an aggregated set of weights.

8. The method of claim 7 further comprising:

determining, by the first client network and for each token of the first set of tokens, a classification of a phrase, and outputting, for each token of the first set of tokens, the classification of the phrase.

9. The method of claim 8 further comprising:

determining that a selected token is a variable with an associated value;

redacting the associated value; and generating a generic token that represents the variable.

10. The method of claim 8 further comprising assigning, by the global federation terminal, an initial machine learning model to the first client network and the second client network.

11. The method of claim 8 further comprising:

storing, by the global federation terminal, the first set of weights and the second set of weights in a parameter storage partition; and storing, by the global federation terminal, the first set of encrypted tokens and the second set of encrypted tokens in an encrypted token storage partition.

12. The method of claim 8 further comprising updating the first set of weights or the second set of weights based on a comparison between the first set of weights and the second set of weights.

13. A method of federated secure vocabulary learning, the method comprising:

receiving, by a global federation terminal and from a first client network, a first set of encrypted tokens;

receiving, by the global federation terminal and from a second client network, a second set of encrypted tokens;

generating, by the global federation terminal, a consolidated vocabulary based on the first set of encrypted tokens and the second set of encrypted tokens;

receiving, by the global federation terminal, a first set of weights from the first client network and a second set of weights from the second client network;

aggregating the first set of weights and the second set of weights; and distributing, to the first client network and the second client network, an aggregated set of weights.

14. The method of claim 13 further comprising:
determining, by the first client network and the first set of encrypted tokens, a classification of a phrase, and
outputting, for the first set of encrypted tokens, the classification of the phrase.

15. The method of claim 14 further comprising:
determining that a selected token is a variable with an associated value;
redacting the associated value; and
generating a generic token that represents the variable.

16. The method of claim 14 further comprising assigning, by the global federation terminal, an initial machine learning model to the first client network and the second client network.

17. The method of claim 14 further comprising:
receiving a first set of weights from the first client network and a second set of weights from the second client network, wherein the first set of weights and the second set of weights are based on the consolidated vocabulary.

18. The method of claim 14 further comprising updating the first set of weights or the second set of weights based on a comparison between the first set of weights and the second set of weights.

* * * * *